(12) United States Patent
Koga (10) Patent No.: US 10,192,332 B2
(45) Date of Patent: Jan. 29, 2019

(54) DISPLAY CONTROL METHOD AND INFORMATION PROCESSING APPARATUS

(71) Applicant: FUJITSU LIMITED, Kawasaki-shi, Kanagawa (JP)

(72) Inventor: Susumu Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/073,024

(22) Filed: Mar. 17, 2016

(65) Prior Publication Data

US 2016/0284051 A1    Sep. 29, 2016

(30) Foreign Application Priority Data

Mar. 26, 2015 (JP) ................................ 2015-064261

(51) Int. Cl.
*G06T 11/20* (2006.01)
*G06T 11/00* (2006.01)

(52) U.S. Cl.
CPC ............ *G06T 11/206* (2013.01); *G06T 11/00* (2013.01)

(58) Field of Classification Search
None
See application file for complete search history.

(56) References Cited

U.S. PATENT DOCUMENTS

| 2012/0001938 A1 | 1/2012 | Sandberg |
| 2012/0139915 A1 | 6/2012 | Muikaichi et al. |
| 2012/0148106 A1* | 6/2012 | Sung ..................... G06T 19/006 382/106 |
| 2013/0012237 A1* | 1/2013 | Hamynen ............ G06F 17/3087 455/456.3 |
| 2015/0130837 A1* | 5/2015 | Ishikawa ............ G02B 27/0093 345/633 |
| 2015/0130848 A1* | 5/2015 | Sakaniwa ............... G06T 17/05 345/666 |

FOREIGN PATENT DOCUMENTS

| EP | 2 787 324 A1 | 10/2014 |
| JP | 2012-38248 | 2/2012 |
| JP | 2013-541058 | 11/2013 |
| JP | 2015-69362 | 4/2015 |
| JP | 2015-77876 | 4/2015 |
| JP | 2013-541058 | 11/2018 |
| WO | 2011/155118 | 12/2011 |
| WO | WO 2012/127605 A1 | 9/2012 |
| WO | 2013/080283 | 6/2013 |

OTHER PUBLICATIONS

Japanese Platform for Patent Information, English Abstract of Japanese Patent Publication No. 2012-38248 published Feb. 23, 2012.
Office Action dated Aug. 28, 2018 issued in Japanese Patent Application No. 2015-06426110/16/2018.
Office Action dated Oct. 23, 2018 issued in Japanese Patent Application No. 2015-064261.
Office Action dated Aug. 28, 2018 issued in Japanese Patent Application No. 2015-064261.

* cited by examiner

*Primary Examiner* — Xiao Wu
*Assistant Examiner* — Mohammad H Akhavannik
(74) *Attorney, Agent, or Firm* — Staas & Halsey LLP (57) ABSTRACT

A method of controlling display of object data includes calculating distances from a terminal to the positions of multiple items of the object data, determining, by a processor, an area based on the distribution of the calculated distances, and displaying object data associated with a position in the determined area on a screen.

13 Claims, 10 Drawing Sheets

| SCENARIO ID | SCENARIO NAME |
|---|---|
| 1 | XX FACTORY INSPECTION |
| 2 | YY FACTORY INSPECTION |
| 3 | ZZ FACTORY INSPECTION |
| ... | ... |

FIG.3B

| PARENT SCENARIO ID | SCENE ID | SCENE NAME |
|---|---|---|
| 1 | 1 | XX FACILITIES INSPECTION |
| 1 | 2 | YY FACILITIES INSPECTION |
| 1 | 3 | ZZ FACILITIES INSPECTION |
| 2 | 1 | AA FACILITIES INSPECTION |
| 3 | 1 | BB FACILITIES INSPECTION |
| ... | ... | ... |

FIG.3C

| PARENT SCENARIO ID | PARENT SCENE ID | AR CONTENTS ID | COORDINATE VALUES | ROTATION ANGLE | SCALING FACTOR | TEXTURE PATH |
|---|---|---|---|---|---|---|
| 1 | 1 | 1 | (Xc1,Yc1,Zc1) | (Xr1,Yr1,Zr1) | (Xs1,Ys1,Zs1) | http://xxx.png |
| 1 | 1 | 2 | (Xc2,Yc2,Zc2) | (Xr2,Yr2,Zr2) | (Xs2,Ys2,Zs2) | http://yyy.png |
| 1 | 1 | 3 | (Xc3,Yc3,Zc3) | (Xr3,Yr3,Zr3) | (Xs3,Ys3,Zs3) | http://zzz.png |
| 1 | 2 | 1 | (Xc4,Yc4,Zc4) | (Xr4,Yr4,Zr4) | (Xs4,Ys4,Zs4) | http://aaa.png |
| 1 | 3 | 1 | (Xc5,Yc5,Zc5) | (Xr5,Yr5,Zr5) | (Xs5,Ys5,Zs5) | http://bbb.png |
| 2 | 1 | 1 | (Xc6,Yc6,Zc6) | (Xr6,Yr6,Zr6) | (Xs6,Ys6,Zs6) | http://ccc.png |
| 3 | 1 | 1 | (Xc7,Yc7,Zc7) | (Xr7,Yr7,Zr7) | (Xs7,Ys7,Zs7) | http://ddd.png |

DISPLAY CONTROL METHOD AND INFORMATION PROCESSING APPARATUS

CROSS-REFERENCE TO RELATED APPLICATION

This application is based upon and claims the benefit of priority of the prior Japanese Patent Application No. 2015-064261, filed on Mar. 26, 2015, the entire contents of which are incorporated herein by reference.

FIELD

A certain aspect of the embodiments discussed herein is related to display control methods and information processing apparatuses.

BACKGROUND

An augmented reality (AR) technique to display object data over part of an image captured with an image capturing device such as a camera is known. For example, based on the position information of a terminal measured using the Global Positioning System (GPS) and on the inclination information of the terminal, object data are displayed over the image captured by the terminal on its screen.

Furthermore, there is a technique to display the position information of surrounding preset object data in a radar map in order to have a user understand at which position around the position information of the terminal the object data are located. The range of the radar display may be set by the user, and the object data are displayed over the image on the screen of the terminal in accordance with the set range.

International Publication Pamphlet No. WO 2012/127605 and Japanese Laid-open Patent Publication No. 2012-38248 may be referred to for related art.

SUMMARY

According to an aspect of the embodiments, a method of controlling display of object data includes calculating distances from a terminal to the positions of multiple items of the object data, determining, by a processor, an area based on the distribution of the calculated distances, and displaying object data associated with a position in the determined area on a screen.

The object and advantages of the embodiment will be realized and attained by means of the elements and combinations particularly pointed out in the claims.

It is to be understood that both the foregoing general description and the following detailed description are exemplary and explanatory and not restrictive of the invention.

DESCRIPTION OF EMBODIMENTS

In the case of setting the range of the radar display as described above, however, it is impossible to appropriately set the display range unless the distance from the position of the terminal to the preset object data is known in advance. For example, if the user sets the display range with a short distance, important object data beyond the distance may be overlooked. On the other hand, in the case where the user sets the display range with a long distance, if multiple object data exist at a short distance from the terminal, the object data are displayed thick at the center, thus making it difficult to understand the positions of the object data.

According to an aspect of the invention, it is possible to make the position of object data easy to understand.

Preferred embodiments of the present invention will be explained with reference to accompanying drawings.

Figure 1:
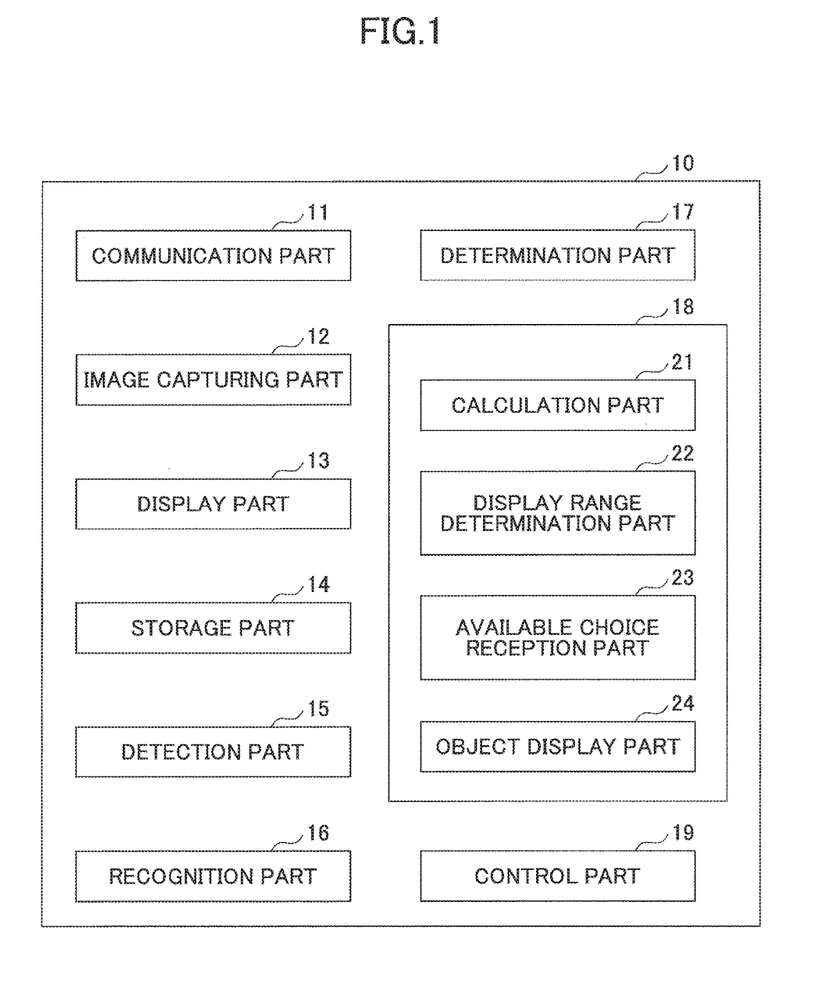
FIG. 1 is a block diagram depicting a functional configuration of a terminal.

A functional configuration of a terminal that is an example of an information processing apparatus according to an embodiment is described with reference to FIG. 1. FIG. 1 is a block diagram depicting a functional configuration of the terminal. According to FIG. 1, a terminal 10 includes a communication part 11, an image capturing part (an image obtaining part) 12, a display part 13, a storage part 14, a detection part 15, a recognition part 16, a determination part 17, a display control part 18, and a control part 19.

The communication part 11 is connected to an external apparatus through a communication network such as the Internet or a local area network (LAN) so as to be able to transmit data to and receive data from the external apparatus. For example, the communication part 11 receives information such as AR contents information from a management server that manages AR contents. The AR contents include object data to be displayed on top of an image displayed on a screen and the position information (coordinate values, a rotation angle, and a scaling factor) of the object data. The object data are, for example, the model data of an object disposed in a three-dimensional virtual space corresponding to a real space, and are, for example, data for superimposition that are displayed over an image captured with the image capturing part 12. The object data include various forms of data such as text, icons, animation, marks, patterns, images, and video.

Furthermore, the communication part 11 may perform short-range communications with computers such as other terminals 10 using a communication technique such as infrared communication, Wi-Fi (registered trademark), or Bluetooth (registered trademark).

The image capturing part 12 captures images at regular frame intervals, and generates image data. The image capturing part 12 may be, but is not limited to, a digital camera, for example. Furthermore, the image capturing part 12 may be contained in the terminal 10 or be an external apparatus connectable to the terminal 10. In the case of attaching the image capturing part 12, by way of non-limiting example, the image capturing part 12 preferably operates at the same inclination and in the same direction as the terminal 10. Furthermore, the image capturing part 12 may obtain image data captured with an external image capturing apparatus. In this case, by way of non-limiting example, the image capturing part 12 preferably has the position information and the orientation information of the image capturing apparatus.

The display part 13 displays a captured image obtained from the image capturing part 12 and a composite image in which AR contents are superimposed on a captured image. Furthermore, the display part 13 displays screens such as a preset menu screen and setting screen for performing a display control process according to this embodiment and an operation screen for operating the terminal 10. Furthermore, the display part 13 may be configured so that information is input through the screen like a touchscreen.

The storage part 14 stores various kinds of information according to this embodiment. For example, under the control of the control part 19, information may be written to and read from the storage part 14. Examples of information stored in the storage part 14 may be, but are not limited to, an AR contents management table for managing AR contents, a scenario management table and a scene management table for distinguishing contents, and various kinds of other setting information.

The detection part 15, for example, obtains the position information and the orientation information of the image capturing part 12 (or the terminal 10) using one or more positioning systems. The positioning system for obtaining position information may be, but is not limited to, for example, a positioning system that obtains position information (latitude, longitude, and altitude) using the GPS or from the position of a connected Wi-Fi network (for example, a router) or mobile network (for example, a base station). Furthermore, when connected simultaneously to multiple Wi-Fi networks or mobile networks, the detection part 15 may obtain the position information of the terminal 10 using the average value of the position information of the networks or the position information of a router or a base station from which a signal is received with the highest strength.

Furthermore, the positioning system for obtaining orientation information may be, but is not limited to, for example, a positioning system that obtains orientation (azimuth) information (a pitch, an azimuth, and a roll) using an electronic compass or a gyroscope. For example, the electronic compass, which is an example of a geomagnetic sensor or an azimuth sensor, may two-dimensionally or three-dimensionally detect the earth's magnetism and obtain the orientation information based on the direction relative to the earth's magnetism. Furthermore, the gyroscope may obtain the orientation information by detecting rotation or a change in the orientation.

The detection part 15 periodically obtains the above-described position information and orientation information. Furthermore, the detection part 15 may obtain the range of image capturing by sensors and the image capturing part 12 (angle-of-view information).

The recognition part 16 recognizes (determines), based on the position information, the orientation information, and the range of image capturing of the image capturing part 12 (or the terminal 10) and the display range of object data set according to this embodiment, whether to display, over the captured image, the object data in a position range obtainable within the captured image.

The determination part 17 determines whether to change the display range of object data according to this embodiment. For example, the determination part 17 determines, based on the travel distance of a user detected by the detection part 15, how much the user has traveled (how much the travel distance of the user has changed). If the user has traveled more than or equal to a preset threshold, the display control part 18 controls the display range of object data.

Furthermore, the determination part 17 may determine to control the display range of object data when, for example, there is a change more than or equal to a threshold in the preset orientation information of the image capturing part 12. Furthermore, the determination part 17 may determine to control the display range of object data in response to the user's instruction to change the display range of object data.

The display control part 18 controls the display range of object data based on the determination result of the determination part 17. When AR contents information registered (recorded) in correlation with a position in an area corresponding to the position and the orientation of the terminal 10 is detected, the display control part 18 displays the object data and the position information of the AR contents information on the screen.

The display control part 18 includes a calculation part 21, a display range determination part 22, an available choice reception part 23, and an object display part 24. The calculation part 21 calculates the distance from the position of the terminal 10 to each of the positions correlated with the items of the object data (object data items). The AR contents information in which the object data and their position information are correlated may be obtained in advance from the management server or be obtained by querying the management server at the start of a calculation process by the calculation part 21.

Furthermore, the calculation part 21 may determine the maximum value, the minimum value, the average value, the standard deviation, and the variance of the position information of the object data. Furthermore, the calculation part 21 may calculate the travel distance or the travel speed of the terminal 10 based on the position information obtained at predetermined time intervals from the detection part 15.

The display range determination part 22 determines the range of object data to be displayed (the display range of object data) on the screen of the display part 13 based on the distribution (for example, density) of the distances calculated by the calculation part 21 (distance distribution). The display range may be, but is not limited to, for example, a distance from the terminal 10 (in a direction away from the terminal 10). For example, the display range determination part 22 determines the display range by adjusting a current display range of 100 m to 120 m, 150 m, 300 m, 500 m, etc., in a direction away from the terminal 10 based on the distance distribution, but the direction in which adjustment is made is not limited to this. For example, the display range determination part 22 may preset the number of object data to be displayed within the display range, and enlarge or reduce the display range so that the preset number of object data may be displayed. The number of object data may be either an actual number or a proportion to the total number of object data.

Furthermore, the display range determination part 22 may determine the display range of object data based on the travel distance or the travel speed of the terminal 10 calculated by the calculation part 21. Furthermore, the display range determination part 22 may determine the display range of object data in accordance with an available choice for the display range received from a user by the available choice reception part 23.

The available choice reception part 23 sets multiple available choices for the display range of object data based on the distribution of the distances calculated by the calculation part 21, and causes the display part 13 to display the set available choices for the display range.

Furthermore, the available choice reception part 23 receives a user's selection of one of the available choices displayed on the display part 13. For example, the available choice reception part 23 may use the position information of each object data item directly as an available choice for the display range, or determine the maximum value, the minimum value, the average value, the standard deviation, or the variance of the position information of the object data and set available choices for the display range in accordance with the determined maximum value, minimum value, average value, standard deviation, or variance.

The object display part 24 displays, in accordance with the display range determined by the display range determination part 22, object data within the display range over a captured image. For example, the object display part 24 displays, in accordance with the orientation information, object data within the field-of-view range (angle-of-view information) of a captured image in the orientation of the orientation information over the captured image. Furthermore, the object display part 24 may display the position information of object data around the terminal 10 in a radar display (guide display) using a radar map in accordance with the display range determined by the display range determination part 22. An image displayed in a radar display is superimposed on a captured image. The superimposed image is displayed on the display part 13 by the object display part 24.

The control part 19 controls the overall configuration of the terminal 10. The control part 19 controls, for example, communications by the communication part 11, image capturing (image obtaining) by the image capturing part 12, displaying by the display part 13, detection by the detection part 15, recognition by the recognition part 16, determination by the determination part 17, and display control by the display control part 18. Furthermore, the control part 19 also controls the start and end of processing and performs control at the time of error occurrence.

Examples of the terminal 10 may be, but are not limited to, a tablet terminal, a smartphone, a personal digital assistant (PDA), a notebook PC, a game apparatus, and a communication terminal such as a cellular phone.

Furthermore, for example, a transmission display device such as a head-mounted display (HMD) or an eyeglass-type display may be used as the terminal 10. The head-mounted display and the eyeglass-type display are wearable devices that include a transmissive screen (display part) at a position corresponding to the eyes of a user (in the field of view of a user). The terminal 10 may display the object data or radar map within the range of the actual field of view of the user by displaying the object data or data map on the transmissive screen through the transmissive screen. The object data or radar map may be displayed as a transparent display object. The display of the object data or radar map is controlled by the display control part 18.

In the case of the head-mounted display or the eyeglass-type display, the configuration related to the display part 13 and other configurations of the terminal 10 may be provided separately, and the same configuration as that of the terminal 10 described above may be achieved by connecting the separately provided configurations.

Figure 2:
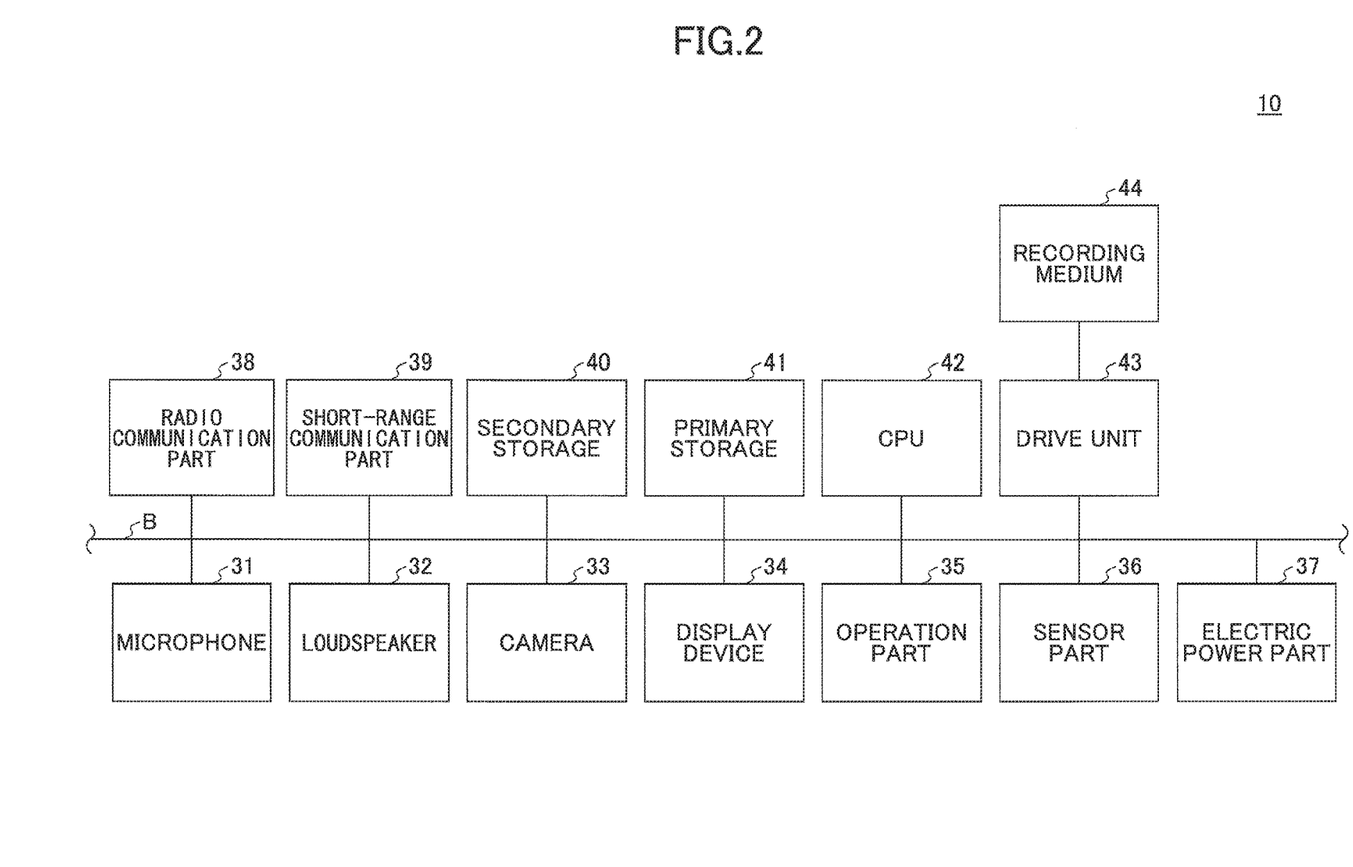
FIG. 2 is a block diagram depicting a hardware configuration of the terminal.

Next, a hardware configuration of a computer that operates as the terminal 10 is described with reference to FIG. 2. FIG. 2 is a block diagram depicting a hardware configuration of the terminal 10. Referring to FIG. 2, the terminal 10 includes a microphone 31, a loudspeaker 32, a camera 33, a display device 34, an operation part 35, a sensor part 36, an electric power part 37, a radio communication part 38, a short-range communication part 39, a secondary storage 40, a primary storage 41, a central processing unit (CPU) 42, and a drive unit 43, all of which are interconnected by a system bus B.

The microphone 31 inputs the voice of a user and other sound. The loudspeaker 32 outputs the voice of a person with whom the user is having a conversation and the sound of a ringtone. For example, the microphone 31 and the loudspeaker 32 may be used in the case of having a conversation with a conversation partner using a calling function. The use of the microphone 31 and the loudspeaker 32, however, is not limited to this, and the microphone 31 and the loudspeaker 32 may be used to input and output information by voice.

The camera 33 captures, for example, an image (either still image or video) of a real space within a preset angle of view. The camera 33 is an example of the above-described image capturing part 12. The camera 33 may be either contained in or externally attached to the terminal 10.

The display device 34 displays screens set by an operating system (OS) or various applications (for example, an image where object data are superimposed on a real space) to a user. The display device 34 is an example of the above-described display part 13. Furthermore, the display device 34 may be a touchscreen display. In this case, the display device 34 also operates as an input and output part. Examples of the display device 34 include displays such as liquid crystal display (LCD)s and organic electroluminescence (EL) displays.

The operation part 35 includes operation buttons displayed on the screen of the display device 34 and operation buttons provided on the exterior of the terminal 10. Examples of operation buttons include a power button, volume control buttons, and operation keys for inputting characters arranged in predetermined order. For example, a user performs a predetermined operation or presses the above-described operation buttons on the screen of the display device 34, so that a touch position on the screen is detected by the display device 34. Furthermore, the display device 34 may display the results of execution of applications, contents, icons, and a cursor.

The sensor part 36 detects the position, inclination (azimuth), and operation of the terminal 10 at some point or the continuous position, inclination (azimuth), and operation of the terminal 10. The sensor part 36 is an example of the above-described detection part 15. Examples of objects of detection by the sensor part 36 may be, but are not limited to, the orientation, angle, direction, position, and acceleration of the terminal 10. Examples of the sensor part 36 may be, but are not limited to, a GPS receiver, a gyroscope, an inclination sensor, and an acceleration sensor.

The electric power part 37 supplies electric power to each configuration of the terminal 10. The electric power part 37 may be, but is not limited to, for example, an internal power supply such as a battery. The electric power part 37 may also detect the amount of electric power constantly or at predetermined time intervals to monitor the remaining amount of electric power.

The radio communication part 38 is, for example, a transmission and reception part of communication data that receives a radio signal (communication data) from a base station (mobile network) and transmits a radio signal to the base station through an antenna.

The short-range communication part 39 may perform short-range communications with computers such as other terminals 10 using a communication technique such as infrared communication, Wi-Fi (registered trademark), or Bluetooth (registered trademark). The above-described radio communication part 38 and the short-range communication part 39 are communication interfaces that enable data to be transmitted to and received from other computers.

The secondary storage 40 is a storage device such as a hard disk drive (HDD) or a solid state drive (SDD). The secondary storage 40 stores programs such as an execution program (for example, a display control program) according to this embodiment and a control program provided in the computer based on a control signal from the CPU 42, and performs an input/output operation as required. Information may be read from the information stored in the secondary storage 40 or read into the secondary storage 40 based on a control signal from the CPU 42.

The primary storage 41 stores the execution program read from the secondary storage 40 based on an instruction from the CPU 42, and stores various kinds of information obtained during execution of a program. Examples of the primary storage 41 include a read-only memory (ROM) and a random access memory (RAM).

The CPU 42 implements processes in the display control according to this embodiment by controlling the processes of the entire computer, such as various kinds of operations and the input of data to and the output of data from hardware configurations, based on control programs such as the OS and the execution program stored in the primary storage 41.

Specifically, for example, by causing a program installed in the secondary storage 40 to be executed based on an instruction for execution of the program obtained from the operation part 35, the CPU 42 executes processes corresponding to the program in the primary storage 41. For example, the CPU 42 executes processes such as the above-described data communications by the communication part 11, image capturing by the image capturing part 12, displaying by the display part 13, storing of various kinds of information by the storage part 14, detection of position information and orientation information by the detection part 15 by executing the display control program. Furthermore, the CPU 42 executes processes such as the above-described position recognition by the recognition part 16, determination by the determination part 17, and display control by the display control part 18 by executing the display control program. The contents of processing in the CPU 42 are not limited to those described above. The results of processes executed by the CPU 42 are stored in, for example, the secondary storage 40 as required.

The drive unit 43, for example, allows loading and unloading of a recording medium 44. The drive unit 43 may read information recorded in the loaded recording medium 44 and write predetermined information to the recording medium 44. The drive unit 43 may be, but is not limited to, for example, a medium loading slot.

The recording medium 44 is a computer-readable recording medium storing the execution program as described above. The recording medium 44 may be, but is not limited to, a semiconductor memory such as a flash memory. Furthermore, the recording medium 44 may be, but is not limited to, a portable recording medium such as a USB memory.

According to this embodiment, by installing the execution program (for example, the display control program) in the above-described hardware configuration of the body of the computer, it is possible to implement the display control process according to this embodiment through the cooperation of hardware resources and software. Furthermore, the display control program corresponding to the above-described display control process may be resident in the terminal 10 or be activated in response to an activation instruction, for example.

Figure 3A:
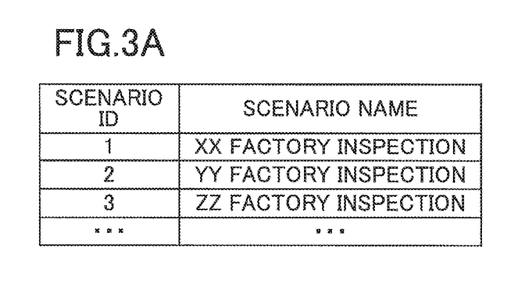
FIGS. 3A through 3C are diagrams depicting examples of data applied in an embodiment.
Figure 3B:
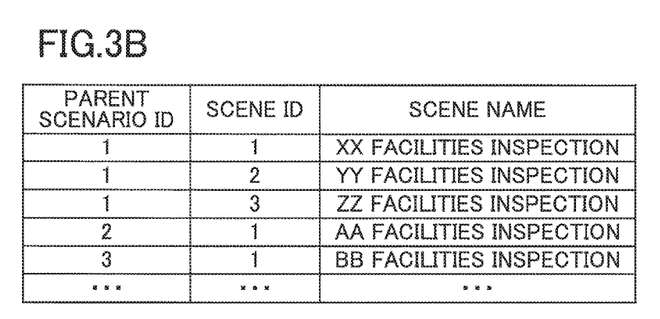
Figure 3C:
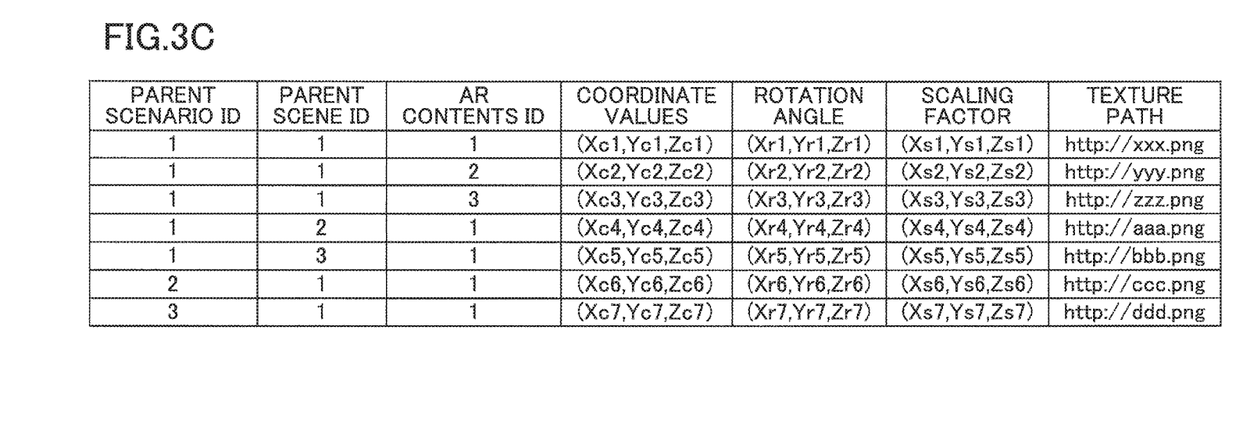
Figure 4:
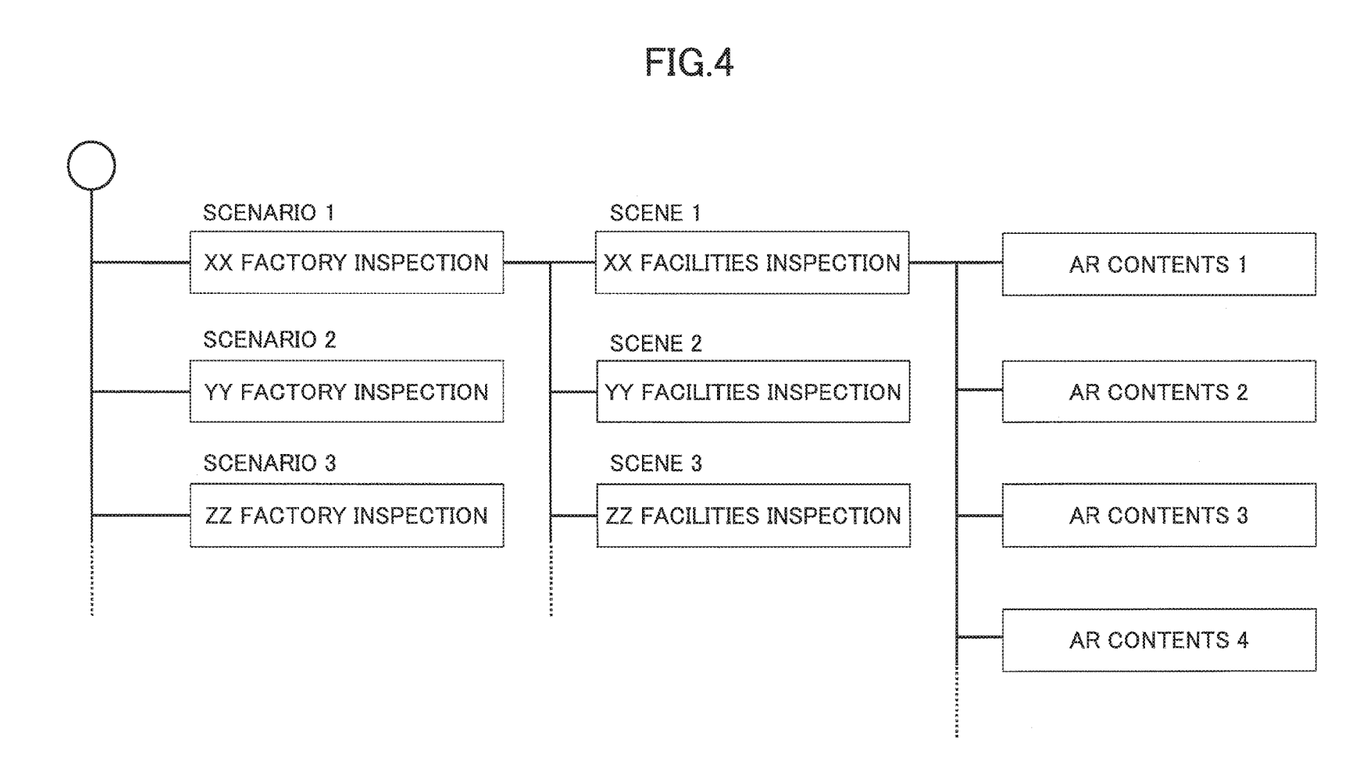
FIG. 4 is a diagram depicting a data configuration of data.

Next, examples of data used in the display control process according to this embodiment are described with reference to FIGS. 3A through 3C and 4. FIGS. 3A through 3C are diagrams depicting examples of data applied in this embodiment. FIG. 4 is a diagram depicting a data configuration of the data. FIG. 3A depicts an example of a scenario management table, FIG. 3B depicts an example of a scene management table, and FIG. 3C depicts an example of an AR contents management table. The information depicted in FIGS. 3A through 3C is an example of the above-described AR contents information. The data format and data structure of the AR contents information, however, are not limited to those depicted in FIGS. 3A through 3C, and may be any information as long as the information correlates object data and their position information.

For example, according to this embodiment, AR contents may be set in correspondence to coordinate values (position information) such as those of a world coordinate system. In the case of a notable place or object, however, multiple object data items are displayed for a single target object, so that all information is not displayed within the screen. For example, in the case of presetting object data in order to notify other workers of precautions and operation details in inspection work in a factory, it may be sufficient if information on a target object which a worker carrying out the inspection is in charge of is obtained. Therefore, according to this embodiment, in order to individually manage such a scenario and a scene, identification information related to scenarios and scenes is stored and managed in a hierarchized manner as depicted in FIGS. 3A through 3C and 4. It is possible for a user to select the type of object data to be displayed over a captured image on the screen by selecting or setting a scenario and a scene according to the user's purpose. Furthermore, by selecting or setting a scenario and a scene, it is possible to limit the display range of object data to, for example, the inside of a particular factory, premise, or building.

Examples of items of the scenario management table may be, but are not limited to, Scenario ID and Scenario Name as depicted in FIG. 3A. Scenario ID sets a scenario for which AR contents are provided. Scenario Name defines a scenario name corresponding to a scenario ID. As a non-limiting example, the scenario names may be distinguished by plan names, work names, or the contents to be presented.

Examples of items of the scene management table may be, but are not limited to, Parent Scenario ID, Scene ID, and Scene Name as depicted in FIG. 3B. Parent Scenario ID indicates the identification information of a scenario, and is correlated with the item of Scenario ID of the scenario management table depicted in FIG. 3A.

Scene ID is the identification information of a scene corresponding to the parent scenario. Scenario ID is segmented into multiple Scene IDs corresponding to predetermined scenes. Furthermore, Scene Name may be, but is not limited to, information such as a place, event, or work details corresponding to a scene ID.

Examples of items of the AR contents management table may be, but are not limited to, Parent Scenario ID, Parent Scene ID, AR contents ID, Coordinate Values, Rotation Angle, Scaling Factor, and Texture Path as depicted in FIG. 3C. Parent Scenario ID is correlated with Scenario ID depicted in FIG. 3A. Parent Scene ID is correlated with Scene ID depicted in FIG. 3B. Parent Scenario ID is segmented into multiple Parent Scene IDs corresponding to predetermined scenes. AR contents ID identifies one or more object data items corresponding to each parent scene ID. Coordinate Values is three-dimensional position information (Xc1, Yc1, Zc1) for displaying object data.

Rotation Angle is information (Xr1, Yr1, Zr1) indicating the degree of three-dimensional inclination of corresponding object data relative to a preset base angle. Scaling Factor is information (Xs1, Ys1, Zs1) indicating the degree of three-dimensional magnification or reduction of corresponding object data with reference to a preset size. According to this embodiment, at least one of Coordinate Values, Rotation Angle, and Scaling Factor described above may be determined as the position information of object data.

Texture Path is the storage destination information of object data corresponding to an AR contents ID. Texture Path may be, but is not limited to, for example, the address information of the management server or an apparatus other than the management server, such as "http://xxx.png", or a storage destination such as a folder. Furthermore, information (a filename) corresponding to object data, such as image data, video data, or text data, may be directly stored in Texture Path.

According to this embodiment, each data example has a hierarchized data configuration as depicted in FIG. 4. Referring to FIG. 4, "XX Factory Inspection" of scenario ID "1" is segmented into multiple scenes, so that "XX Facilities Inspection" (scene 1), "YY Facilities Inspection" (scene 2), and "ZZ Facilities Inspection" (scene 3) are set. These may be expressed in a hierarchized manner, and AR contents 1 through 4 are set for each scene. That is, multiple AR contents may be set for each scene. Referring to FIG. 4, data are managed in the image of a tree structure. The structure in which data are managed, however, is not limited to this.

The above-describe data are information obtained in advance from the management server via a communication network such as the Internet or a LAN and stored in the storage part 14. The above-described data may also be obtained from the management server when the display control process according to this embodiment is executed, for example. How the above-described data are obtained, however, is not limited to these. Furthermore, the above-described data may be set in correlation with user information obtained from the terminal 10. Furthermore, only information required by the terminal 10 may be obtained. Furthermore, the information stored in the storage part 14 is not limited to the above-described data, and user information, processing history information, and various kinds of configuration information (settings information) may be stored in the storage part 14.

Figure 5:
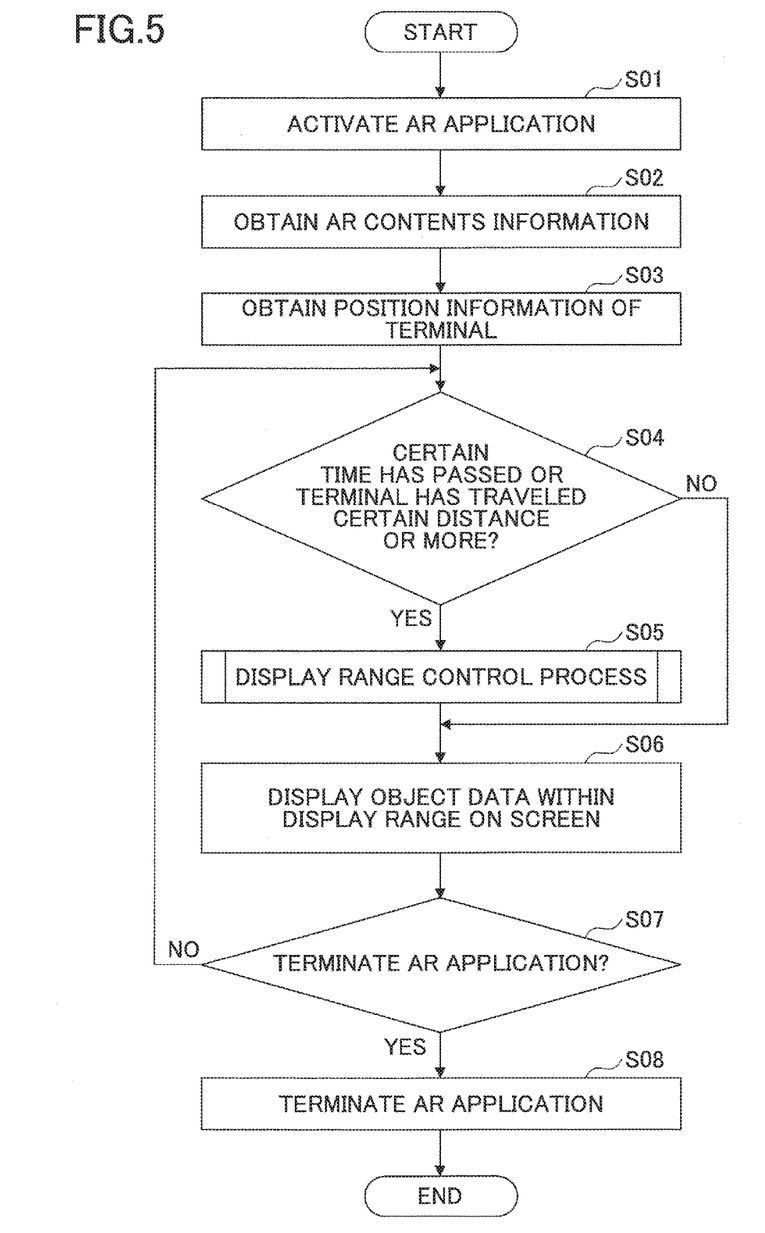
FIG. 5 is a flowchart depicting an example of a display control process according to the embodiment.

Next, an example of the display control process according to this embodiment is described with reference to FIG. 5. FIG. 5 is a flowchart depicting an example of the display control process according to this embodiment. Referring to FIG. 5, at step S01, the control part 19 of the terminal 10 activates an AR application that implements the display control process according to this embodiment. Next, at step S02, the control part 19 obtains AR contents information as depicted in FIGS. 3A through 3C from the management server.

At step S01, in response to the activation of the AR application, for example, the image capturing part 12 may start capturing an image so that the captured image is obtained from the image capturing part 12, or a captured image may be obtained from other than the image capturing part 12 to be displayed on the screen. Furthermore, when the terminal 10 is a display device such as a head-mounted display, a real space ahead of a transmissive screen (display part) instead of a captured image is viewed through the transmissive screen. Furthermore, at step S02, AR contents information stored in advance in the storage part 14 may alternatively be obtained. Furthermore, at step S02, for example, a user may select a scenario and a scene corresponding to AR contents (object data) desired to be displayed from among the above-described scenarios and scenes, and AR contents information corresponding to the selected scenario and scene may be obtained.

Next, at step S03, the detection part 15 obtains the position information of the terminal 10. At step S03, for example, the position information is periodically measured. Next, at step S04, the determination part 17 determines whether a certain time has passed or whether the terminal 10 has traveled a certain distance or more. At step S04, it may be determined by comparison with a threshold value whether there is a change of a certain amount or more in the orientation information.

If it is determined at step S04 that a certain time has passed or the terminal 10 has traveled a certain distance or more (YES at step S04), at step S05, a display range control process is executed. At step S05, the distance between the terminal 10 and object data contained in the AR contents information is calculated, and the display range of object data is determined based on the travel distance or travel speed of the terminal 10, so that the display range of object data is set. A specific example of the display range control process is described below.

Next, after step S05, or if it is determined at step S04 that a certain time has not passed or the terminal 10 has not traveled a certain distance or more (NO at step S04), at step S06, the display control part 18 displays object data within the display range on the screen. At step S06, object data may be displayed over a captured image displayed on the screen or the position information of surrounding object data based on the display range may be displayed in a radar display.

Next, at step S07, the control part 19 determines whether to terminate the AR application. In the case of not terminating the AR application (NO at step S07), the process returns to step S04. In the case of terminating the AR application (YES at step S07), at step S08, the running AR application is terminated, and the process ends.

Figure 6:
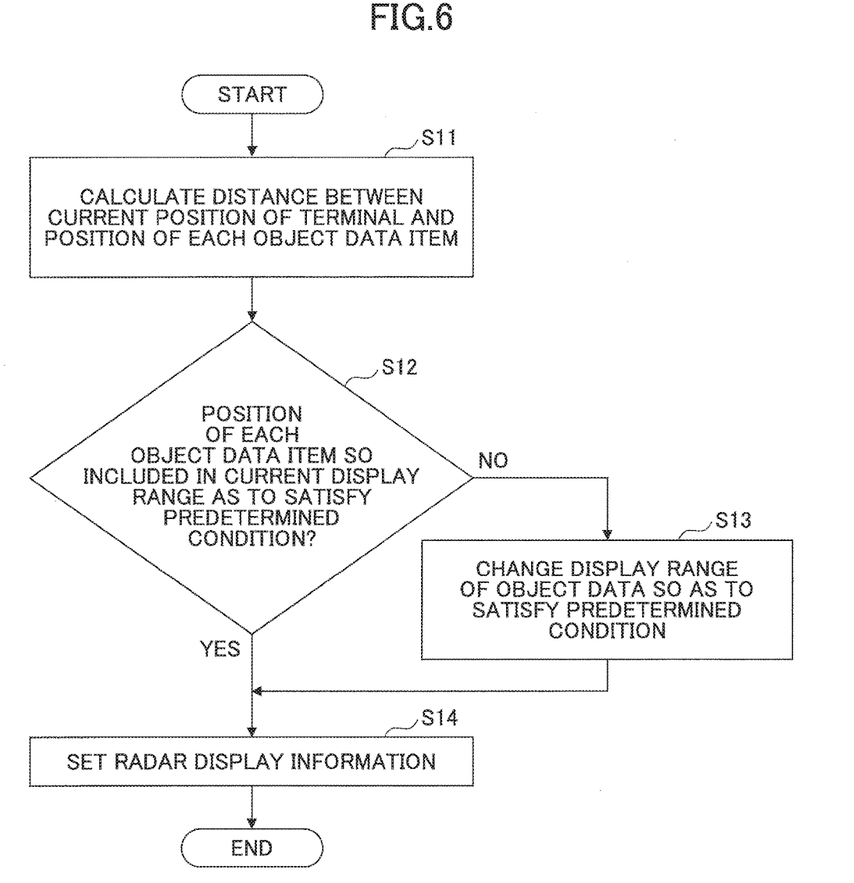
FIG. 6 is a flowchart depicting a first embodiment of a display range control process.

Next, a first embodiment of the above-described display range control process (step S05) is described with reference to FIG. 6. FIG. 6 is a flowchart depicting the first embodiment of the display range control process. According to the first embodiment, the display range is controlled in accordance with the travel position of the terminal 10 (without consideration to the travel speed).

Referring to FIG. 6, at step S11, the display control part 18 calculates the distance between the current position (coordinates) of a user and the position (coordinates) of each object data item contained in the AR contents information obtained at step S02 described above. Next, at step S12, the display control part 18 determines whether the position of each object data item is so included in the current display range as to satisfy a predetermined condition.

Here, the predetermined condition at step S12 may be, for example, that a certain percentage of all preset object data are within the current display range based on the distribution of the distances of the object data from the terminal 10. In this case, a certain percentage may serve as a first threshold.

Alternatively, the display control part 18 may calculate the average or median plus α (where a is distance correction information) of the distances of the object data from the position of the terminal 10, and it may be employed (determined) as the predetermined condition that the calculation result is included in the current display range. In this case, the calculation result may serve as a second threshold. The predetermined condition, which may be affected by, for example, a condition such as a geography or an environment of a target image (captured image) over which the object data are displayed, may be suitably customizable.

If it is determined at step S12 that the predetermined condition is not satisfied (NO at step S12), at step S13, the display control part 18 changes the display range of object data so as to satisfy the predetermined condition. At step S13, for example, assuming that the number of preset object data is 100 and the percentage (first threshold) of displayed object data in the preset object data is 75%, the display control part 18 changes (for example, enlarges or reduces) the display range so that 75 object data items are displayed. The above-described first threshold (75) may be provided with a predetermined range such as a range of 70 to 80. Furthermore, at step S13, the average or median plus α of the distances of the object data may be calculated from the current position of the terminal 10, and the calculation result (second threshold) may be employed (determined) as the display range.

Furthermore, if it is determined at step S12 that the position of each object data item is so included in the current display range as to satisfy the predetermined condition (YES at step S12), or after step S13, at step S14, the display control part 18 sets radar display information in accordance with the display range.

As described above, in the case of considering the travel position, the display range (latitude, longitude, and altitude) of object data is determined with reference to a predetermined display range (display radius). Furthermore, a specific example of the radar display may be either a two-dimensional display with longitude and latitude or a three-dimensional spherical display with the user at its center.

Figure 7:
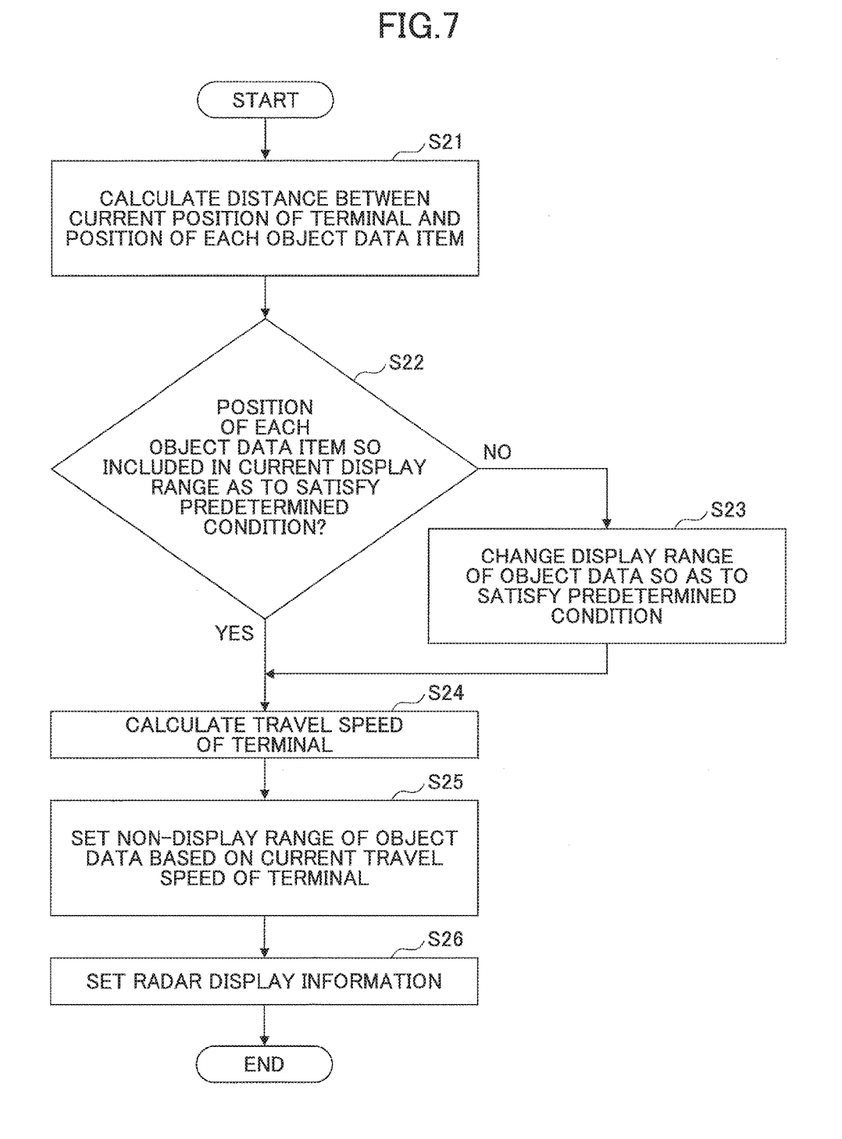
FIG. 7 is a flowchart depicting a second embodiment of the display range control process.

Next, a second embodiment of the above-described display range control process (step S05) is described with reference to FIG. 7. FIG. 7 is a flowchart depicting the second embodiment of the display range control process. According to the second embodiment, the display range is controlled in accordance with the travel speed of the terminal 10.

Referring to FIG. 7, at step S21, the display control part 18 calculates the distance between the current position (coordinates) of a user and the position (coordinates) of each object data item contained in the AR contents information obtained at step S02 described above. Next, at step S22, the display control part 18 determines whether the position of each object data item is so included in the current display range as to satisfy a predetermined condition.

A specific description of the predetermined condition, which is the same as in the first embodiment, is omitted. If it is determined at step S22 that the predetermined condition is not satisfied (NO at step S22), at step S23, the display control part 18 changes the display range of object data so as to satisfy the predetermined condition the same as in the first embodiment.

Furthermore, if it is determined at step S22 that the position of each object data item is so included in the current display range as to satisfy the predetermined condition (YES at step S22), or after step S23, at step S24, the display control part 18 calculates the travel speed of the terminal 10 using, for example, an acceleration sensor.

Next, at step S25, the display control part 18 sets the range of object data not to be displayed (the non-display range of object data) based on the current travel speed of the terminal 10. For example, in the case of considering the travel speed of the terminal 10, object data at a short distance from the terminal 10 that have once entered the display range quickly go out of the range of the field of view of the user (the display range) if the terminal 10 (user) is moving at high speed by car or train. Therefore, it is highly likely that it would be difficult to provide the user with proper information. Furthermore, in the above-described case, even if object data are displayed in the same manner as normally displayed, the object data are displayed only for a moment. Furthermore, the display of remote object data may be hindered. Therefore, according to the second embodiment, at step S25, for example, the non-display range of object data is set separately from the display range of object data in order to address the above-described case. As a result, when the terminal 10 (user) is moving at high speed, it is possible to prevent unnecessary object data that are passed quickly (in a moment) from being displayed.

Here, as an example setting of the non-display range, letting the travel speed of the terminal 10 be 60 km/h and letting the minimum display time of object data be 3 seconds, the non-display range is approximately 50 m (60 km/h=16.7 m/s, 16.7 m/s×3 s≈50 m). Accordingly, the non-display range is a range within a distance of 50 m from the terminal 10, and the display control part 18 may exclude object data included in the non-display range from object data to be displayed. Thus, as a non-limiting example, the non-display range may be set in accordance with the travel speed.

Next, at step S26, the display control part 18 sets radar display information in accordance with the display range or the non-display range.

Next, example screens to which this embodiment is applied are described with reference to FIGS. 8A and 8B. In the following examples, a tablet terminal is illustrated as an example of the terminal 10. The terminal 10, however, is not limited to a tablet terminal, and may be, for example, a display device such as a head-mounted display.

Figure 8A:
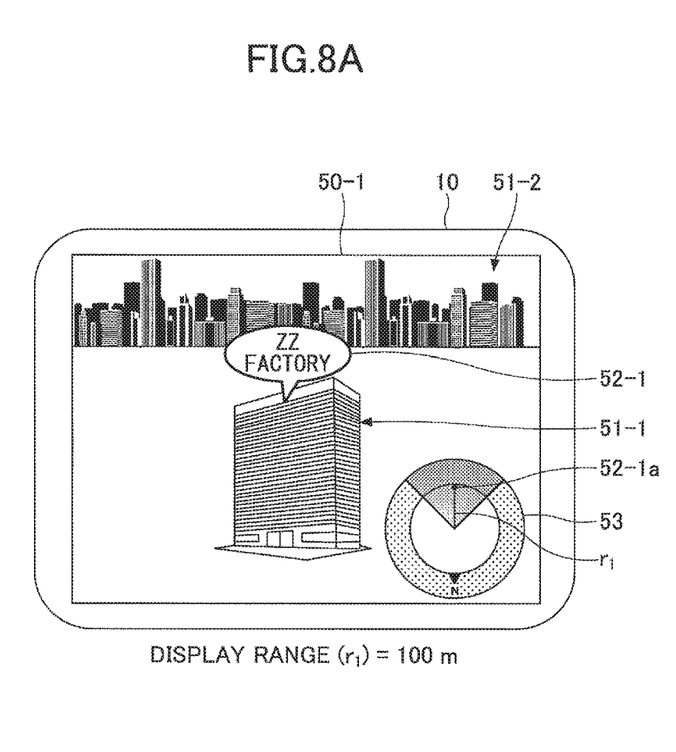
FIGS. 8A and 8B are diagrams depicting screen display examples of object data according to the embodiment.
Figure 8B:
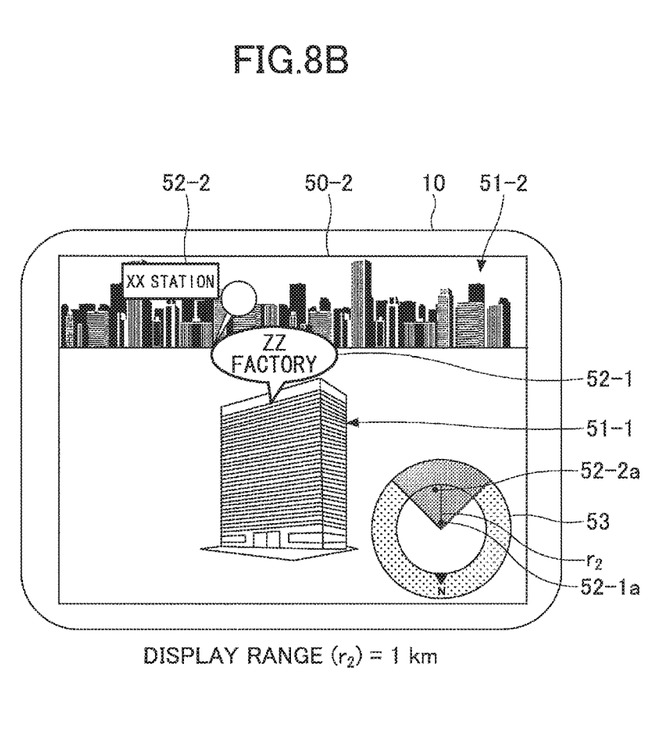

FIGS. 8A and 8B are diagrams depicting screen display examples of object data according to this embodiment. FIG. 8A illustrates how object data are viewed in the case of a display range of 100 m, and FIG. 8B illustrates how object data are viewed in the case of a display range of 1 km.

FIG. 8A depicts a display example in the case where the display range of object data (a radius $r_1$) is set to 100 m on a screen 50-1 of the display part 13 of the terminal 10. On the screen 50-1, real objects (objects in a real space) 51-1 and 51-2 are displayed as a captured image. Furthermore, a radarscope (radar map) 53 is displayed at a predetermined position on the screen 50-1 (for example, in the lower right corner of the screen 50-1). The shape of the radarscope 53 is not limited to a circular shape, and may be, for example, a rectangular shape. Furthermore, while the radarscope 53 is two-dimensionally displayed using latitude and longitude, the form of display of the radarscope 53 is not limited to this, and the radarscope 53 may be displayed three-dimensionally (with latitude, longitude, and altitude) like a sphere.

On the radarscope 53, position information 52-1a of object data 52-1 displayed on the screen 50-1 is displayed. Furthermore, object data outside the display range (potential object data for display), which are not displayed on the screen 50-1 but exist around the terminal 10, may also be displayed on the radarscope 53.

According to this embodiment, the display range may be automatically changed in accordance with the distance distribution of object data and the travel position or travel speed of the terminal 10. Accordingly, when the display range is changed to 1 km (a radius $r_2$) on a screen 50-2 as depicted in FIG. 8B, it is possible to display object data 52-2 correlated with the real object 51-2 located 1 km ahead in the image capturing direction. Furthermore, the position information 52-1*a* of the object data 52-1 and position information 52-2*a* of the object data 52-2 are displayed on the radarscope 53.

The object data to be displayed on the screen of the display part 13 may be set scenario by scenario or scene by scene. The object data may be preset by a user or set in accordance with a position at which the terminal 10 (the image capturing part 12) is capturing an image, the direction of capturing an image, and/or the travel speed of the terminal 10.

Figure 9A:
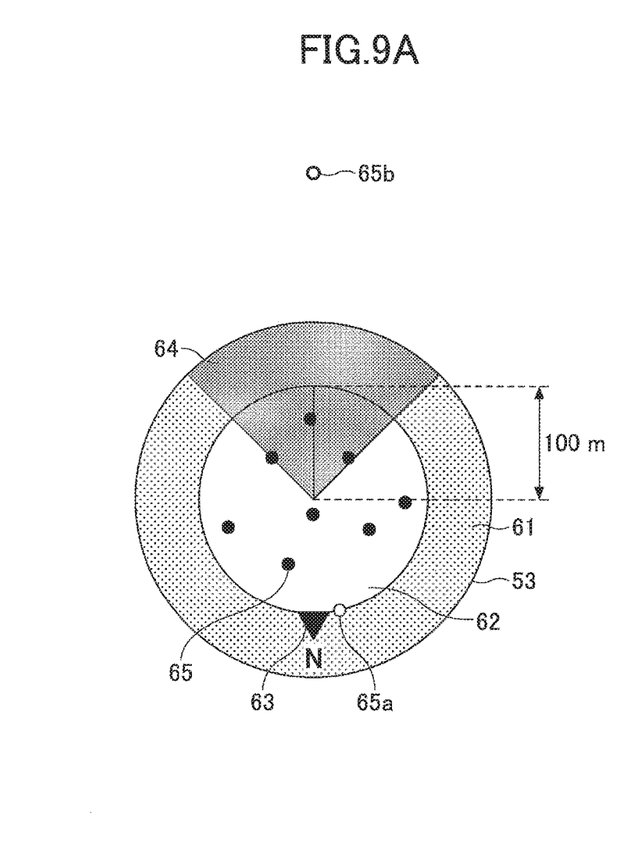
FIGS. 9A and 9B are diagrams depicting radar display examples according to the embodiment.
Figure 9B:
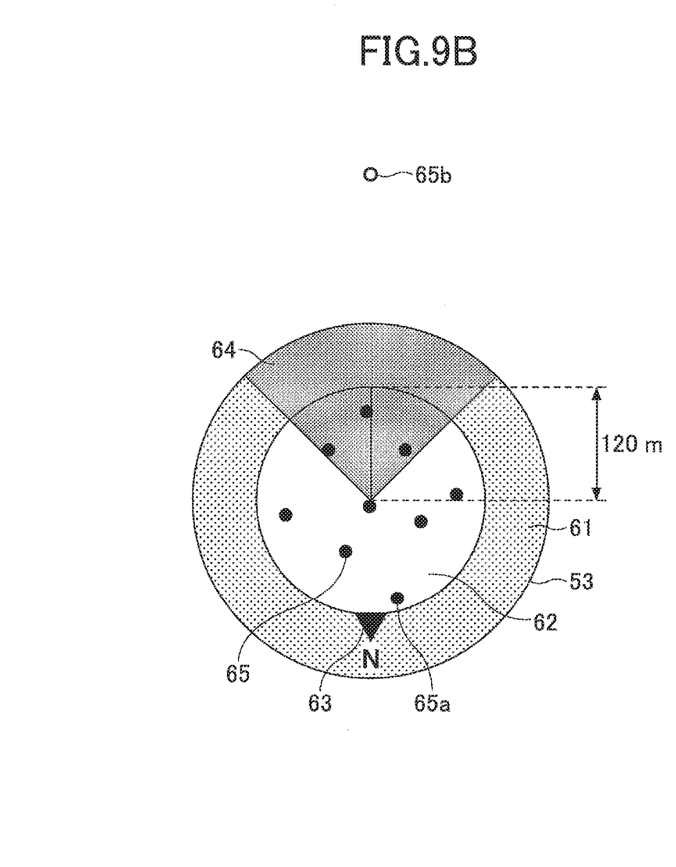
Figure 10A:
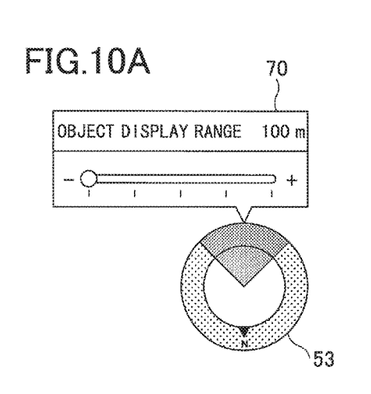
FIGS. 10A through 10E are diagrams depicting example screens for selecting a display range.
Figure 10B:
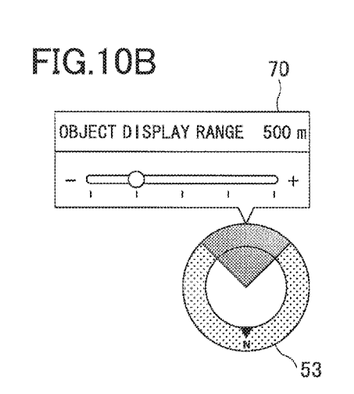
Figure 10C:
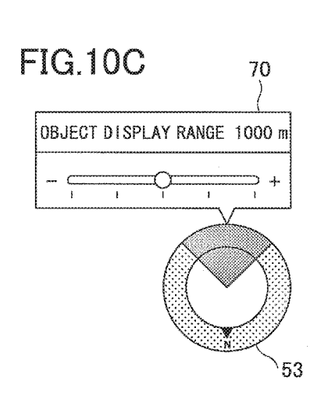
Figure 10D:
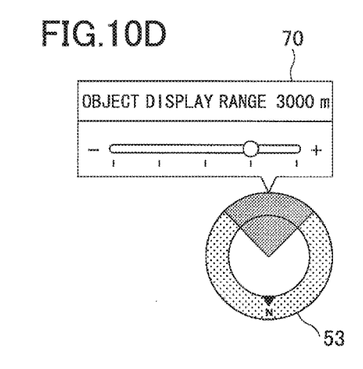
Figure 10E:
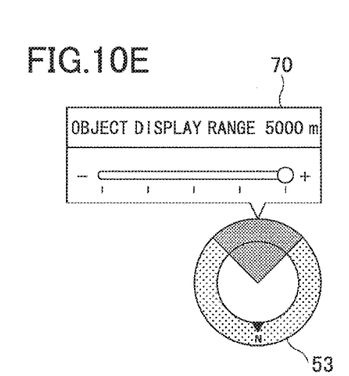

FIGS. 9A and 9B are diagrams depicting radar display examples according to this embodiment. FIGS. 9A and 9B depict examples of the radarscope 53 illustrated in FIGS. 8A and 8B. Referring to FIGS. 9A and 9B, an extra-display range area (reserve area) 61, a display range area 62, a direction display area 63, a field-of-view area 64, and object data position information 65 are displayed on the radar 53. The object data position information 65 is positions (coordinates) obtained from the position information of AR contents information.

The extra-display range area 61 is an area (outside the display range area 62) where the position information of object data around the terminal 10 that are not displayed on the screen are displayed. The display range area 62 is an area where the position information of object data displayable on the screen is displayed. By changing the orientation of the field-of-view area 64 by the terminal 10 (the image capturing part 12) turning in another direction, corresponding object data are displayed on the screen. The direction display area 63 is an area where a predetermined direction (for example, north) is displayed. Furthermore, the field-of-view area 64 is an area where object data are displayed.

According to this embodiment, the position of the terminal 10 dynamically changes due to, for example, a movement of a user who holds the terminal 10 or the update of the position information of the GPS. Therefore, according to this embodiment, object data may be appropriately displayed in accordance with a position by resetting the display range every time the user moves or the position information of the GPS is updated.

For example, when a user moves forward approximately several tens of meters before the position information of the GPS is updated, object data position information 65*a* moves out of a preset display range because of the user's movement as illustrated in FIG. 9A. According to this embodiment, however, the display range is dynamically changed based on the distribution (density) of the positional relationships (distances) between the user (terminal 10) and the object data. Accordingly, it is possible to constantly display object data desired by a user on the radarscope 53.

In the example of FIG. 9B, the display range is enlarged from 100 m to 120 m, but the size of enlargement is not limited to this. For example, the display range may be enlarged from 100 m to 200 m or from 100 m to 500 m in accordance with, for example, the travel speed. Furthermore, the size of enlargement or reduction may be adjusted based on a user's settings.

Object data position information 65*b* illustrated in FIGS. 9A and 9B, which is information at a point 1 km or more away from the position of the terminal 10, does not have to be displayed on the radarscope 53. Furthermore, according to this embodiment, it may be unknown whether a user desires object data located 1 km ahead or object data within the range of approximately 100 m. Therefore, several patterns of the display range may be set based on the distribution of the distances of object data as available choices and be displayed on the screen, and the position information of object data may be displayed based on the display range pattern selected by the user.

FIGS. 10A through 10E are diagrams depicting example screens for selecting a display range. According to the examples of FIGS. 10A through 10E, available choices of the display range of object data are displayed based on the distribution (density) of the distances between the position information of the terminal 10 and object data, a selected one of the available choices is received, and the display range of object data is determined in accordance with the received one of the available choices. The above-described position information of each object data item may be determined directly as an available choice for the display range, or the maximum value, the minimum value, the average value, the standard deviation, and the variance of the position information of the object data may be determined and the determined maximum value, minimum value, average value, standard deviation, and variance may be set as available choices for the display range.

According to the examples of FIGS. 10A through 10E, the maximum display range of object data is set to a distance of 5000 m from the terminal 10 based on the distribution (density) of the distances between the position information of the terminal 10 and the object data. The distance of 5000 m may be the distance between the terminal 10 and the object data item whose distance from the terminal 10 is the largest. According to the examples of FIGS. 10A through 10E, a display range list 70 having scale marks corresponding to display ranges (distances) of 100 m, 500 m, 1000 m, 300 m, and 5000 m, which are set using 5000 m as a reference, is displayed. As a non-limiting example, the display range list 70 may be displayed by, for example, touching the radarscope 53 on the screen.

A user may set a desired display range by sliding a set position in the display range list 70, and the terminal 10 receives the display range selected by the user and implements a corresponding display of object data. The manner of displaying the display range list 70 is not limited to this, and the display range list 70 may be displayed with various interfaces such as a check box and a radio box.

As described above, according to this embodiment, it is possible to easily understand the position of object data. For example, a display range is calculated from the current location information of a user (obtained with the GPS) and the position information of object data, and the calculated display range is made available for selection as the initial setting value or a step setting value of a radarscope. This embodiment may be applied to either AR using an AR marker (vision-based AR) or location-based AR.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A method of controlling display of object data, the method comprising:
   calculating distances from an actual current position of a terminal to positions of a plurality of items of the object data;
   determining, by a processor, whether the positions of the plurality of items are so included in a first area as to satisfy a predetermined condition, based on a distribution of the calculated distances, the first area being a current area including the actual current position of the terminal, the predetermined condition being an average of the calculated distances plus a correction or a median of the calculated distances plus a correction;
   determining, by the processor, a second area based on a result of determining whether the positions of the plurality of items are so included in the first area as to satisfy the predetermined condition; and
   displaying object data associated with a position in the second area on a screen,
   wherein the first area is changed to the second area so that the positions of the plurality of items satisfy the predetermined condition in response to determining, by the processor, that the positions of the plurality of items are not so included in the first area as to satisfy the predetermined condition, and
   wherein the second area includes the actual current position of the terminal.

2. The method as claimed in claim 1, wherein each of the first area and the second area is a distance from the actual current position of the terminal.

3. The method as claimed in claim 1, further comprising:
   displaying a plurality of available choices of the second area based on the distribution of the calculated distances; and
   receiving a selected one of the plurality of available choices of the second area,
   wherein said determining determines the second area in accordance with the received one of the plurality of available choices.

4. The method as claimed in claim 1, further comprising:
   presetting a number of items of the object data to be displayed within an area; and
   changing a scale of the first area so that the preset number of items of the object data are displayed within the second area.

5. The method as claimed in claim 1, further comprising:
   calculating a travel speed of the terminal; and
   setting a non-display area based on the calculated travel speed, wherein object data associated with a position in the non-display area is not displayed on the screen.

6. The method as claimed in claim 1, further comprising:
   displaying object data associated with the actual current position in the first area in response to determining, by the processor, that the positions of the plurality of items are so included in the first area as to satisfy the predetermined condition.

7. The method as claimed in claim 1, further comprising:
   obtaining position information of the terminal; and
   determining whether a certain time has passed since previous obtaining of the position information of the terminal or whether the terminal has traveled a certain distance since the previous obtaining of the position information of the terminal,
   wherein said calculating the distances is executed in response to determining that the certain time has passed or the terminal has traveled the certain distance since the previous obtaining of the position information of the terminal.

8. A non-transitory computer-readable recording medium having stored therein a program that causes a computer to execute a process, the process comprising:
   calculating distances from an actual current position of a terminal to positions of a plurality of items of object data;
   determining whether the positions of the plurality of items are so included in a first area as to satisfy a predetermined condition, based on a distribution of the calculated distances, the first area being a current area including the actual current position of the terminal, the predetermined condition being an average of the calculated distances plus a correction or a median of the calculated distances plus a correction;
   determining a second area based on a result of determining whether the positions of the plurality of items are so included in the first area as to satisfy the predetermined condition; and
   displaying object data associated with a position in the second area on a screen,
   wherein the first area is changed to the second area so that the positions of the plurality of items satisfy the predetermined condition in response to determining that the positions of the plurality of items are not so included in the first area as to satisfy the predetermined condition, and
   wherein the second area includes the actual current position of the terminal.

9. The non-transitory computer-readable recording medium as claimed in claim 8, wherein the process further comprises displaying object data associated with the actual current position in the first area in response to determining that the positions of the plurality of items are so included in the current area as to satisfy the predetermined condition.

10. The non-transitory computer-readable recording medium as claimed in claim 8, wherein the process further comprises
    obtaining position information of the terminal; and
    determining whether a certain time has passed since previous obtaining of the position information of the terminal or whether the terminal has traveled a certain distance since the previous obtaining of the position information of the terminal,
    wherein said calculating the distances is executed in response to determining that the certain time has passed or the terminal has traveled the certain distance since the previous obtaining of the position information of the terminal.

11. An information processing apparatus, comprising:
    a processor that executes a process including
        calculating distances from an actual current position of the information processing apparatus to positions of a plurality of items of object data;
        determining whether the positions of the plurality of items are so included in a first area as to satisfy a predetermined condition, based on a distribution of the calculated distances, the first area being a current area including the actual current position of the information processing apparatus, the predetermined condition being an average of the calculated distances plus a correction or a median of the calculated distances plus a correction;

determining a second area based on a result of determining whether the positions of the plurality of items are so included in the first area as to satisfy the predetermined condition; and displaying object data associated with a position in the second area on a screen, wherein the first area is changed to the second area so that the positions of the plurality of items satisfy the predetermined condition in response to determining that the positions of the plurality of items are not so included in the first area as to satisfy the predetermined condition, and wherein the second area includes the actual current position of the information processing apparatus.

12. The information processing apparatus as claimed in claim 11, wherein the process further includes displaying object data associated with the actual current position in the first area in response to determining that the positions of the plurality of items are so included in the first area as to satisfy the predetermined condition.

13. The information processing apparatus as claimed in claim 11, wherein the process further includes obtaining position information of the terminal; and determining whether a certain time has passed since previous obtaining of the position information of the terminal or whether the terminal has traveled a certain distance since the previous obtaining of the position information of the terminal, wherein said calculating the distances is executed in response to determining that the certain time has passed or the terminal has traveled the certain distance since the previous obtaining of the position information of the terminal.

* * * * *